(12) United States Patent  (10) Patent No.: US 11,594,195 B2
Hochman et al.  (45) Date of Patent: Feb. 28, 2023

(54) UNLIMITED PIXEL CANVAS FOR LED VIDEO WALLS

(71) Applicant: H2VR HoldCo, Inc., Walnut, CA (US)

(72) Inventors: Jeremy Hochman, Walnut, CA (US); Scott M. Blair, Austin, TX (US); Christopher S. Byrne, Pasadena, CA (US)

(73) Assignee: H2VR HoldCo, Inc., Walnut, CA (US)

( * ) Notice: Subject to any disclaimer, the term of this patent is extended or adjusted under 35 U.S.C. 154(b) by 0 days.

(21) Appl. No.: 17/727,980

(22) Filed: Apr. 25, 2022

(65) Prior Publication Data

US 2022/0254317 A1  Aug. 11, 2022

Related U.S. Application Data

(63) Continuation of application No. PCT/US2020/057385, filed on Oct. 26, 2020.

(60) Provisional application No. 62/925,794, filed on Oct. 25, 2019.

(51) Int. Cl.
*G09G 5/00* (2006.01)
*G09G 5/14* (2006.01)
*G09G 5/22* (2006.01)

(52) U.S. Cl.
CPC ............... *G09G 5/006* (2013.01); *G09G 5/14* (2013.01); *G09G 5/227* (2013.01); *G09G 2300/026* (2013.01); *G09G 2360/04* (2013.01)

(58) Field of Classification Search
CPC ................................................. G09G 2300/026
See application file for complete search history.

(56) References Cited

U.S. PATENT DOCUMENTS

2014/0098006 A1* 4/2014 Jenks ................... G06F 3/1446
345/1.3

* cited by examiner

*Primary Examiner* — Gustavo Polo
(74) *Attorney, Agent, or Firm* — Downs Rachlin Martin PLLC (57) ABSTRACT

Methods, systems and devices for displaying video content on large, high resolution video walls, which may comprise a mesh network of an array of display tiles with redundant network switching, in which a virtual, unlimited pixel canvas is created in a video controller memory to facilitate packetizing and addressing of video content packets for delivery to the video wall through a packet-switched network. Embodiments disclosed are particularly well-suited for use with video walls employing LED tiles.

28 Claims, 6 Drawing Sheets

UNLIMITED PIXEL CANVAS FOR LED VIDEO WALLS

RELATED APPLICATION DATA

This application is a continuation of PCT/US2020/057385 filed on Oct. 26, 2020, and titled "Unlimited Pixel Canvas For LED Video Walls", which application claims the benefit of priority of U.S. Provisional Patent Application Ser. No. 62/925,794, filed Oct. 25, 2019, and titled "Unlimited Pixel Canvas Utilizing Multiple Video Ingest Nodes on a Network". Each of these applications is incorporated by reference herein in its entirety.

FIELD OF THE DISCLOSURE

The present disclosure generally relates to the field of LED video walls. In particular, the present disclosure is directed to systems and methods providing an unlimited pixel canvas for LED video walls.

BACKGROUND

Traditional large video display walls, such as LED video walls are made up of an array of light-emitting display modules, often referred to as tiles. Each tile represents X·Y pixels at a fixed pixel pitch/density, for example, 512×512 pixels. It is not unusual to have many variations of the tiles in unlimited pixel densities due to manufacturing cost and complexity. In addition, each tile is a fixed size, for example, 500 mm wide×500 mm high. Further, LED video walls generally utilize proprietary data protocols over a non-industry-standard physical medium to deliver the video signal. Some manufacturers utilize RS485, some use Ethernet Layer 2, some use Ethernet Layer 1. Due to this non-standard method of distributing data to the tiles, an LED processor or controller (hereinafter "LED controller") is generally used as a signal converter in order to get a standardized video signal, such as HDMI, DVI, DisplayPort, SDI, or another format to the manufacturer's proprietary format.

It is often difficult to send video content in a simple manner to the video wall, even with the "LED controller" because the resulting resolution of the video wall frequently does not correspond to a standard video content raster. As an example, a physical video wall size for a particular installation may be required to be 5 meters wide by 2.5 meters high. Using a common LED tile size, with dimensions as previously mentioned (500 mm×500 mm), this would result in an array of 10 tiles wide×5 tiles high. With the 512×512 pixel tiles, the resulting pixel resolution is 5120 pixels wide×2560 pixels high. In this case, the physical size of the video wall installation has dictated the resolution, since the tiles are a fixed size and pixel density. The resulting resolution far exceeds UHD/4k resolution (3840×2160) and thus a traditional display using current UHD/4K technology must employ multiple video streams with extremely complex computers and/or video devices in order to provide sufficient pixel data to utilize the full resolution of the video wall.

Figure 6:
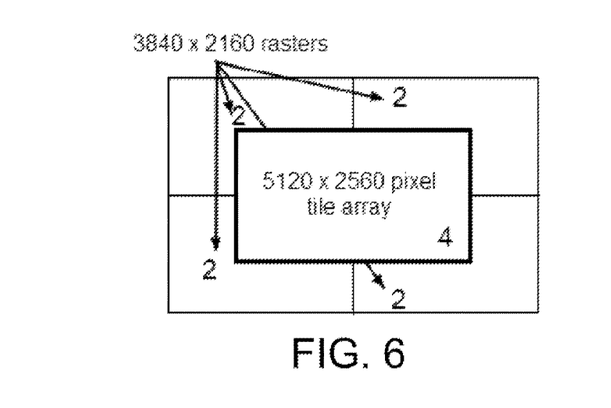
FIG. 6 is a diagram illustrating correspondence of a large video wall tile array to standard UHD/4K video rasters.
Figure 7:
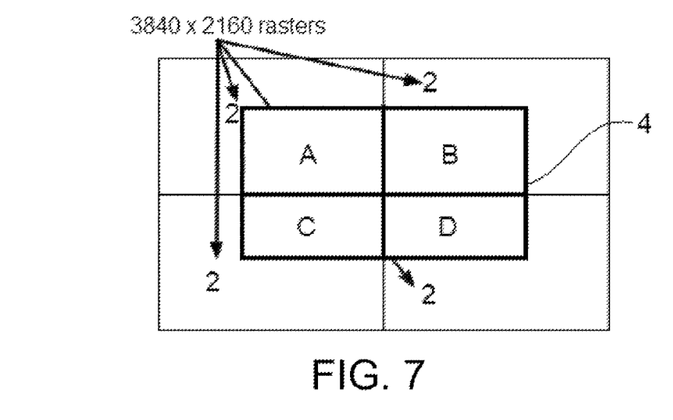
FIG. 7 is a diagram illustrating an arrangement of displays for creating the large video wall tile array in FIG. 6.

Existing technology for driving this example video wall is explained in more detail with reference to FIGS. 6, 7 and 8. As illustrated in FIG. 6, four UHD rasters 2 must be utilized so that the 5120×2560 pixel tile array 4 can overlap a portion of each raster in order to receive enough pixel data to display on the tiles. Each of the UHD rasters contains information at not more than UHD/4K resolution corresponding to the portion of the image to be displayed on a portion of the video wall driven by its connected LED controller. In general, the video wall tile array must be divided into sufficient separate displays, each driven by its own LED controller, so that no individual display has a resolution greater than UHD/4K.

Figure 4:
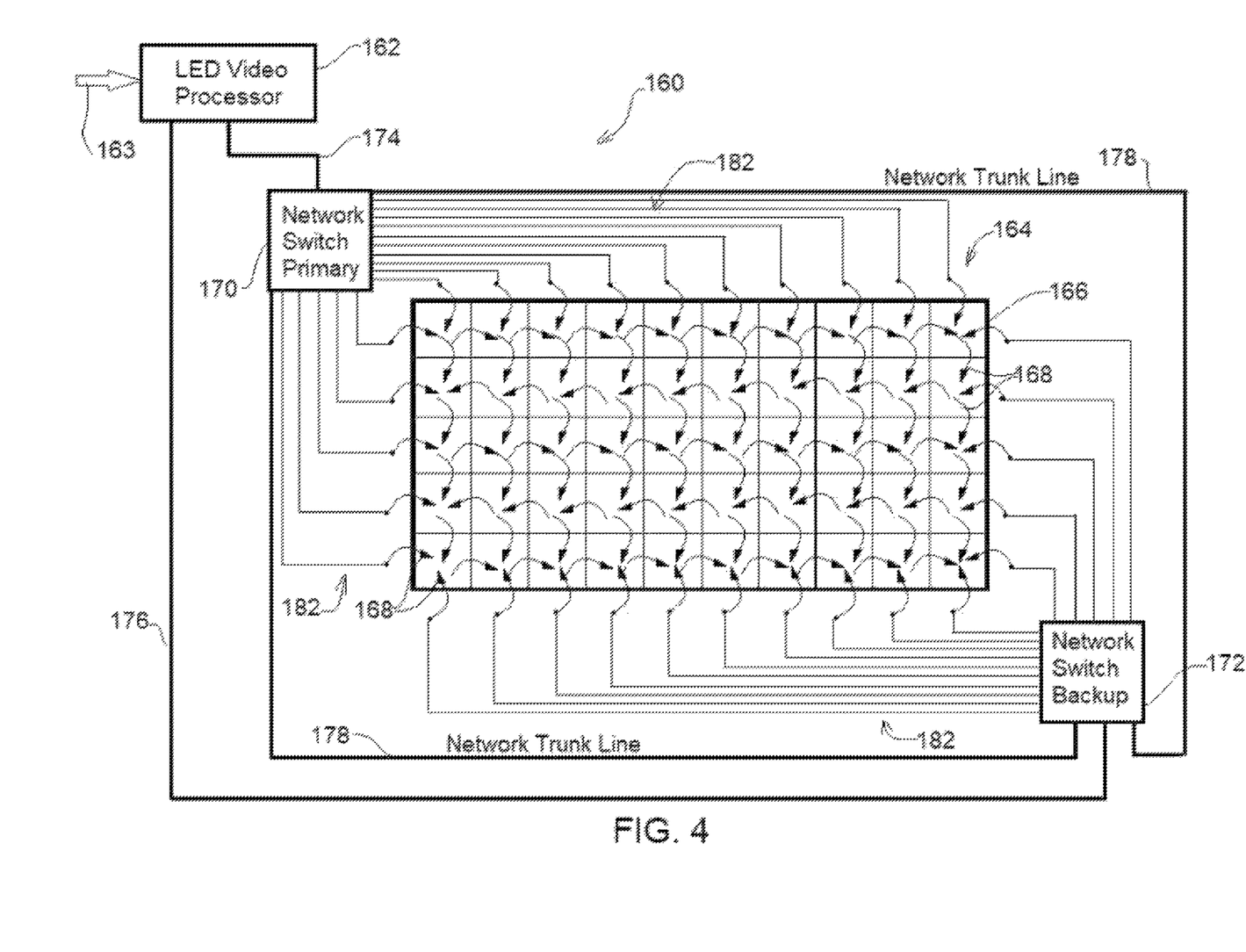
FIG. 4 is a schematic diagram of an embodiment of a networked video wall system according to the present disclosure.

Another challenge presented by current technology results from the fact that typically the individual LED tiles are not electronically aware that they are part of a larger, single video wall with multiple tiles. Thus, despite the fact that tile array 4 might appear to have a seamless image, it is actually configured as shown in FIG. 7 with four separate display portions A, B, C and D, each configured as an independent display receiving one of four separate video feeds. However, in this case, as is often the case, the four separate displays cannot have equal resolution (i.e., all four at 2560×1280 pixels) because the physical sizes of the tiles do not permit it. Using current technology, one LED tile cannot bridge two video rasters, so to create the 5120×2560 pixel tile array 4 using 512×512 pixel tiles, two displays (A and B) have a pixel resolution of 2560×1536 and two displays (C and D) have a pixel resolution of 2560×1024. The unequal display resolutions required thus adds further set up and processing complications video source feeds must be precisely parsed in advance to match the specific resolution of the display portion to which they will be directed. Further, due to how the video feeds (A, B, C, D) must be aligned to traditional video rasters, there is a waste of bandwidth on both the video raster feeds going into the LED processors and also a waste of pixel processing bandwidth within each LED processor as these pixels do not get transmitted to an LED tile in a display.

Figure 8:
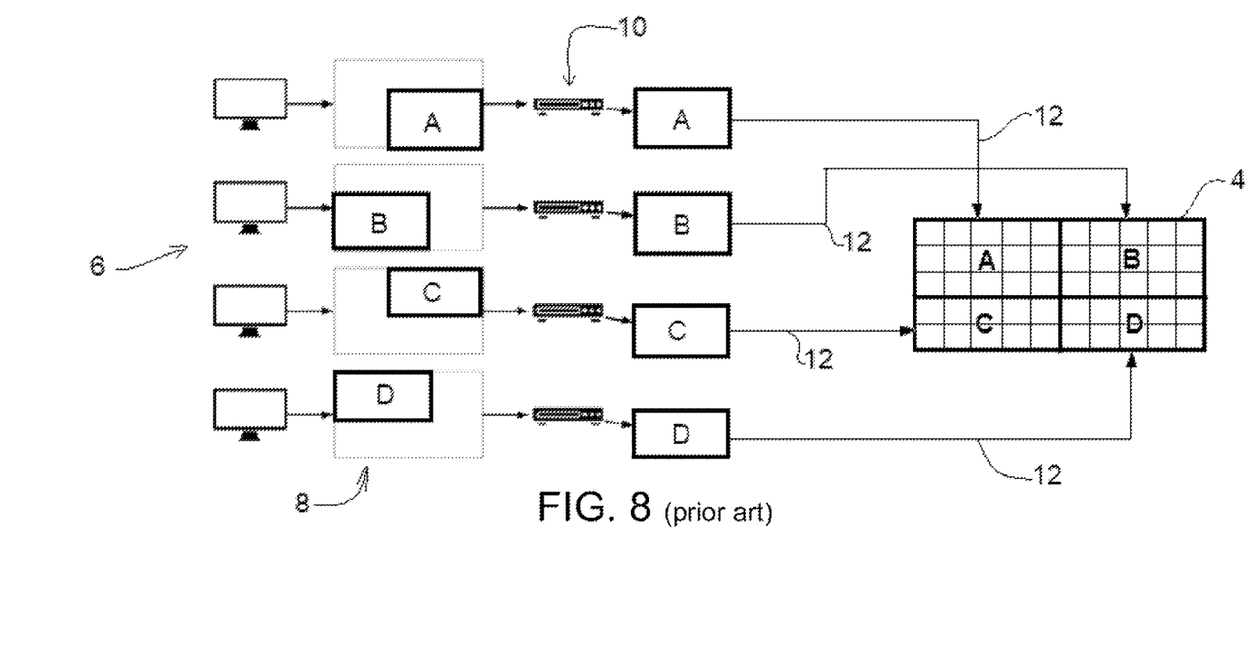
FIG. 8 is a block diagram illustrating a prior art system for providing video content to a large video wall, such as the video wall shown in FIGS. 6 and 7.

A prior art system for driving the example video wall 4 might typically be configured as shown in FIG. 8. Using existing technology, each display portion (A, B, C, and D) requires its own LED controller running independent video content corresponding to the portion of the larger display wall of which it is a part. Thus, as shown in FIG. 8, the video signal path must be fully replicated four times, despite the fact that the resulting display for the observer is a singular display. Not only are four video sources 6 required, each providing the appropriate portion 8 of the final image, but also four independent LED controllers 10. Each LED controller 10 generates its image portion for the corresponding display portion A, B, C or D and communicates with that display portion via dedicated connections 12 specific to that individual controller/display portion pairing. In reality, however, the cabling complexity is much greater than shown in the simplified schematic illustration in FIG. 8 because dedicated connections 12 must individually connect to each LED tile to provide its portion of the video signal for the display portion (A,B,C,D) in which the tile resides. Such complex cabling requirements have led to other problems in providing a robust system with failsafe protections.

For example, current technologies for creating and controlling arrayed video devices, such as the prior art video wall system shown in FIG. 8, can exhibit a large gap in data redundancy and display resilience. In current systems, display tiles are commonly daisy-chained from one to the next until the capacity of the data line is maximized in order to provide a video signal path to each tile. In some prior systems, a backup line can be used in order to provide a fail-safe if the primary link goes down (due to upstream equipment or cable fault). Both methods are rudimentary, however, and still pose an aesthetically displeasing result. Moreover, such systems do not protect against multiple data link failures between tiles. For example, in a daisy-chained system, even with a backup data link, two separate data link failures will result in dead tiles between the failed data links.

While network communication techniques might be employed to simplify connections, communications and processing challenges with high resolution video walls, and other challenges presented by packet-based networking have limited its application. In a normal video system comprised of inputs and outputs, it is relatively straightforward to choose a specific x,y coordinate of the incoming video as a starting point to re-transmit a signal. The x,y start coordinate and width/height of the retransmission block is easy to ascertain because video formats are raster based—this means that line-by-line, or section-by-section, the data is transmitted from top left to lower right in a scanning order. However, in a packet switched network, for example an Ethernet payload, traffic routed on Ethernet switches is not required to receive or send packets in any meaningful order—the switches only deliver a packet from point A to B. The randomness of such networks thus traditionally has made delivery of high resolution video content at a high quality problematic.

SUMMARY OF THE DISCLOSURE

In one implementation, the present disclosure is directed to a method for delivering video content comprising pixel data to a high resolution video wall comprised of an array of video display tiles, each video display tile having a unique address within the array. The method includes receiving one or more video input streams containing pixel data for rendering the video content on the video wall; virtually rendering the video content in a memory from the one or more video input streams to form a virtual representation of the video content in the memory at a resolution at least equal to the video wall resolution; partitioning pixel data from the virtual representation into pixel data packets each with the unique tile address for tile positions in the video wall corresponding to the pixel data position in the virtual representation; and transmitting the pixel data packets to the video wall through a packet-switched network.

In another implementation, the present disclosure is directed to a video controller for rendering video content on a high resolution video wall, the video wall comprised of an array of display tiles with each tile having a unique tile address within the array. The video controller includes a processor and memory configured to receive one or more video input streams containing pixel data for rendering the video content across the display tile array, the memory contains instructions configured to be executed by the processor to cause the video controller to virtually render the video content from the one or more video input streams in memory to form a virtual representation of the video content in the memory at a resolution at least equal to the video wall resolution; partition pixel data from the virtual representation into pixel data packets each with the unique tile address for tile positions in the video wall tile array corresponding to the pixel data position in the virtual representation in the memory; and transmit the pixel data packets to the video wall through a packet-switched network.

In yet another implementation, the present disclosure is directed to a video wall system, which includes an array of adjacent display tiles forming a video wall having a video wall resolution, each display tile having a unique tile address and a display surface comprised of a pixel array surrounded by plural tile edges, the display wall having a periphery defined by open tile edges not adjacent another tile edge; data connections at each tile edge forming a data link with each adjacent tile in the array of display tiles, the data links configured to transfer at least video signal data and control data; a video controller configured to receive one or more video input streams and output packetized video content for display on the video wall; at least one primary network switch communicating with the video controller through at least one primary network connection; at least one backup network switch communicating with the video controller through at least one backup network connection; primary tile connections comprising independent network connections between the at least one primary network switch and each of at least a first plurality of tile edge data connections on open tile edges; and backup tile connections comprising independent network connections between the at least one backup network switch and each of at least a second plurality of tile edge data connections on open tile edges; whereby the at least one primary network switch directs packetized video content to the tile array for display according to tile addresses assigned to the video content packets and the at least one backup network switch provides plural redundant pathways for video content packets in the event of failure of one or more tile data connections so as to eliminate or reduce display errors resulting from failed tile data connections.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Systems and methods of this disclosure present a change in paradigm for the operation of video wall controllers, referred to herein as video controllers, also sometimes called a video processor or LED processor. Not only do disclosed systems and methods simplify things for a user who is setting up a video wall, they also provide for an unlimited pixel canvas on the video wall tile array without the worry of tiles crossing raster boundaries. In certain embodiments this is accomplished by virtually creating within the video controller a singular, unlimited pixel canvas with pixel resolution corresponding to the display wall tile array resolution. A single video controller according to the present disclosure is capable of receiving and merging the plurality of video rasters received to support the video wall resolution into a single, unlimited canvas of appropriate resolution which can then be parsed to specific video wall inputs and re-packetized so as to be received at the correct tile/pixel location in the video wall. Moreover, in the event that pixel resolution of the video wall exceeds the capacity of a single video controller, video controllers as disclosed herein can be networked together to combine their processing capacity such that all controllers combine their respective unlimited pixel canvases into a single super pixel canvas comprising the plurality of unlimited pixel canvases from the plurality of networked controllers. In other words, the plurality of video controllers works as a cluster (e.g., a distributed computing network) to send a unified pixel data protocol to the video wall tile array. Using the systems and methods described herein, display tiles in a video wall array may span across input video rasters while being controlled as a single array (rather than an array per video raster as in the prior art). While the teachings of the present disclosure are applicable to any type of high-resolution arrayed video display wall, the present disclosure presents particular advantages for set-up and control of video walls comprised of LED tiles and in the design of LED video wall controllers (a/k/a "LED processors").

By using IP-based video signals, such as the SMPTE ST2110 or SDVoE protocols, or a streaming TCP/IP movie or television service, it is possible to more dynamically define signals between sources and destinations as they all share a common large-capacity data backbone rather than a signal being defined by a discrete cable/signal relationship as it was previously. This allows for intelligence in the network to allow devices to dynamically determine things like resolution and coordinates to allow for load balancing between a plurality of processing devices.

Figure 1:
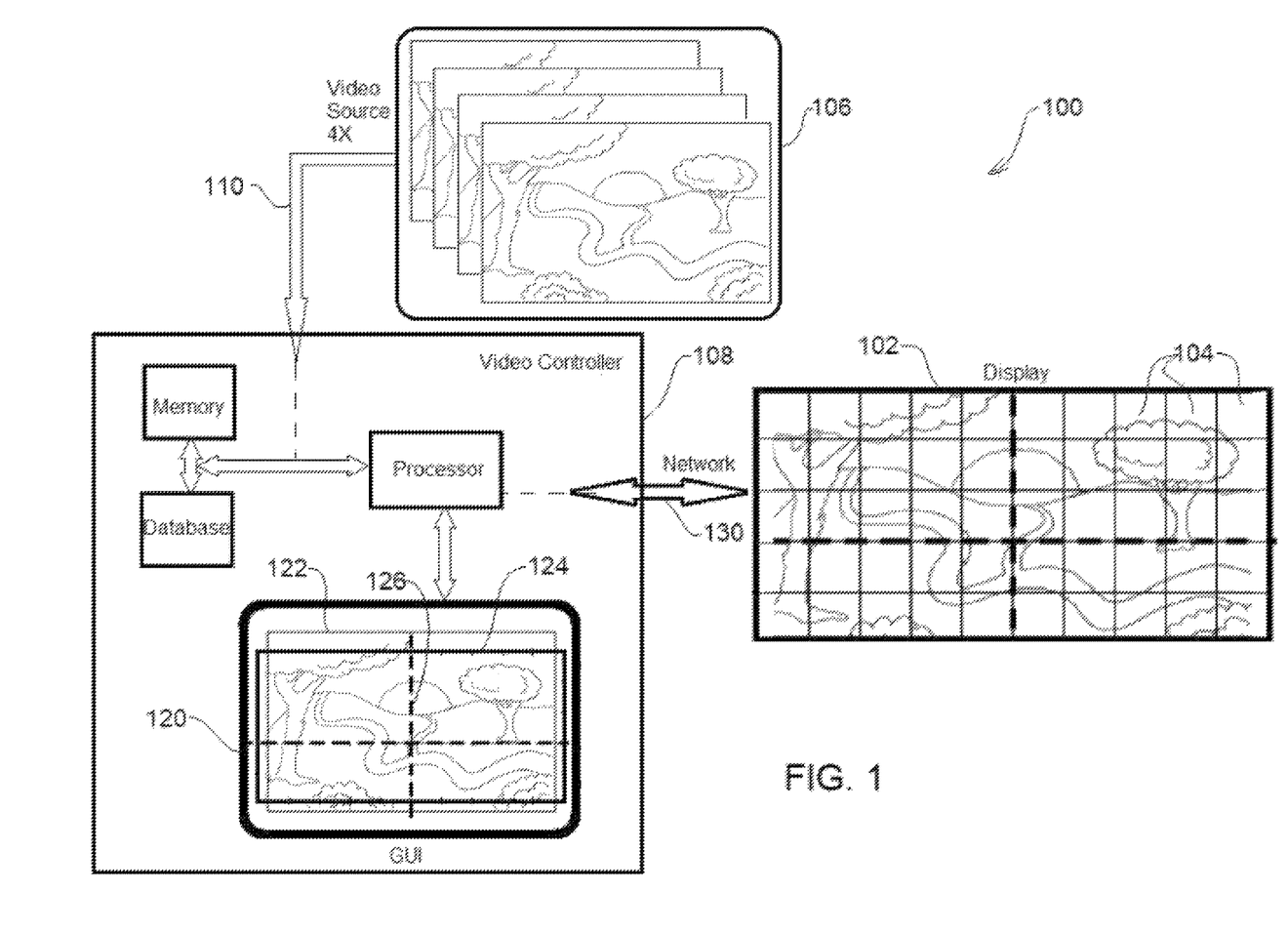
FIG. 1 is a block diagram depicting an embodiment of an video wall processing system and method according to the present disclosure.

FIG. 1 illustrates an embodiment of system 100 according to the present disclosure for providing video to video wall 102 having (in this illustrative example) the same resolution as video wall 4 described above (5 meters wide by 2.5 meters high, made up of 50 half-meter square, 512×512 pixel tiles 104 with an overall resolution of 5120 pixels wide×2560 pixels high). As will be appreciated by persons of ordinary skill, the teachings of the present disclosure are equally applicable to video walls of any resolution or size. As previously described, video source 106 provides four separate video feeds representing four UHD rasters in order to provide sufficient pixel data to meet the physical resolution of video wall 102. However, unlike prior systems, the four input rasters do not need to be carefully matched to the physical display tile configuration or boundaries within video wall 102. As explained in more detail below, the raster size or resolution of the input video streams can vary from the final display tile array with the only limitations being that no individual input stream exceeds the bandwidth limitations of the video controller input connections and together the input streams equal (or exceed) the final display wall resolution. Communication link 110 between video source 106 and video controller 108 may comprise any suitable video signal carrying link such as HDMI, DVI, DisplayPort, SDI, etc. Alternatively, the video source feeds may be provided as IP-based video signals (or other digital/packetized network system), in which case communication link 110 may be an appropriate IP network communication connection or other suitable network connection.

Video controller 108 includes a user interface (GUI) 120, which includes a display of the video source. Video controller 108 also may include other computer device components such as memory, storage, one or more processors and internal communications, etc. Video controller 108 also receives information about the configuration of video wall 102 either automatedly via bidirectional communication with the video wall or via direct user input. Video controller 108 merges the plurality of received video rasters (in this example, four) into a single unlimited pixel canvas, which is a virtual recreation of a larger resolution video input within a controller memory. The pixel canvas created in the controller memory is unlimited in the sense that as a virtual recreation it has no physical restrictions and can match or exceed any resolution video wall. Where the video wall resolution exceeds the processing capacity of a single video controller, the video controllers of the present disclosure may be networked to form a processing cluster as described below. The unlimited pixel canvas allows an individual video controller to re-packetize the video signal for transmission to the final display device via a packet-switched network with appropriate network addressing. In the case of a video controller processing cluster (see, e.g., FIG. 3), the video controllers may communicate with each other to determine which controller is most efficient to re-packetize the video signal for transmission to the final display device.

In some embodiments, the input video rasters thus merged are presented to the user in GUI 120 as unlimited pixel canvas 122. GUI 120 also presents frame tool 124 representing the outer boundary of the display area (frame) of video wall 102. Frame tool 124 allows the user to position the video image within the video wall frame. Where the resolution or aspect ratio of the video source image and video wall are not the same, the user has the option of using frame tool 124 to select the portion of the video image to be displayed, further processing the video input through a video scaler (which may be integrated with or separate from video controller 108) or to resample the video image to match the frame.

Figure 1A:
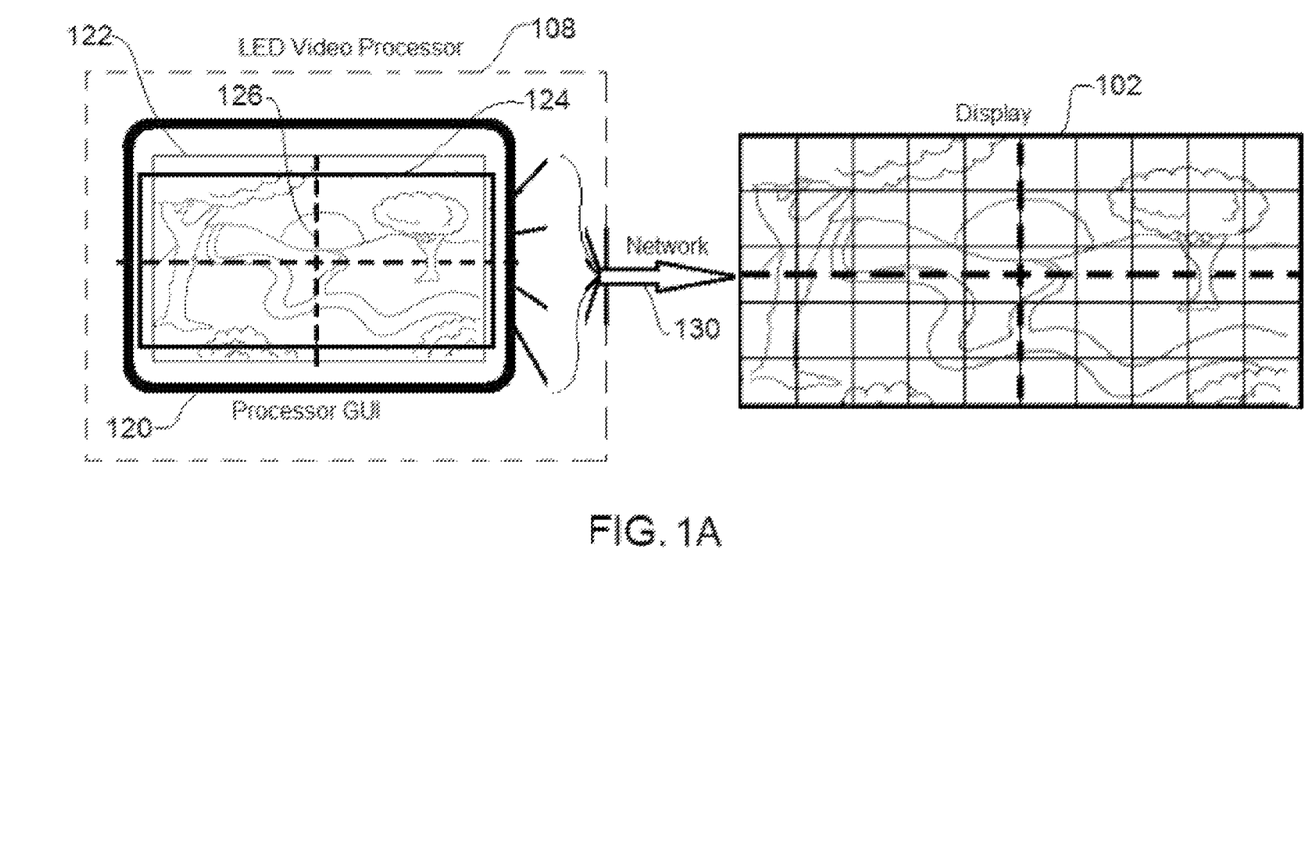
FIG. 1A is a partial block diagram depicting an alternative image selection using the systems and methods of FIG. 1

GUI 120 also presents the user with raster tool 126. Raster tool 126 allows the user to dictate which portion of each video raster feed is addressed to the tile array of video wall 102. As previously described, the overall pixel resolution of video wall 102 requires four video rasters to supply sufficient pixel information. Thus, in the example presented in FIG. 1, raster tool 126 assembles pixel canvas 122 within frame tool 124 from the four video source 106 quadrants, one each corresponding to a portion of the pixel canvas virtually generated by video controller 108. Raster tool 126 may be positioned anywhere within frame tool 124 so long as no video display segment defined by the raster tool would exceed the resolution of the input video rasters. Note that video display segments thus defined need not align with the physical configuration of the tile array. While FIG. 1 shows the horizontal divider of raster tool 126 aligned with the physical boundary between two tile rows, FIG. 1A shows another equally valid arrangement with the horizontal divider of raster tool 126 positioned down the center of the middle row of tiles such that the four video segments defined all have an equal resolution of 2560×1280 pixels. (Note that the representation of the raster tool on display 102 in FIGS. 1 and 1A is only a point of reference to facilitate understanding of the disclosure. It does not form a part of the embodiments). Embodiments disclosed herein thus provide an important advantage over prior systems in that the input video rasters do not need to be "pre-defined" to match the physical layout of the tile array before being delivered to the video controller. All that is required is that the individual feeds do not exceed bandwidth limitations of the input network and that in total, the input video rasters meet or exceed the display wall resolution. Within these minimal parameters, the input/output relationship of the video streams is arbitrary and the input and output video streams can have zero geographic alignment to each other.

Because the packetization (or rasterization) of the incoming video signals need not match the tile array size (i.e., the virtual video frame boundary has nothing to do with a physical video wall tile boundary), the video controller first assembles the video frame into memory, re-slices the video into the tile-size pieces, and then re-packetizes the video in packets of the correct sizes and addressed to the intended tile destination all in as close to real-time as possible (generally within one frame of video). It should be noted that while the example of FIGS. 1 and 1A uses four video input rasters (streams), any number of input rasters may be used. As will be appreciated by persons of ordinary skill, the number of input rasters may be scaled down to a single input stream or scaled up to over 100 streams as long as the bandwidth and final resolution parameters are met. In general, embodiments disclosed herein may support N number of packet-based video input streams (IP or MAC or other), X number of video packet-based tile output streams (each tile output stream comprises the pixel data to a specific tile), in which there does not need to be a relationship between the input and output packet boundaries other than input number N will be less than output number X.

Figure 2:
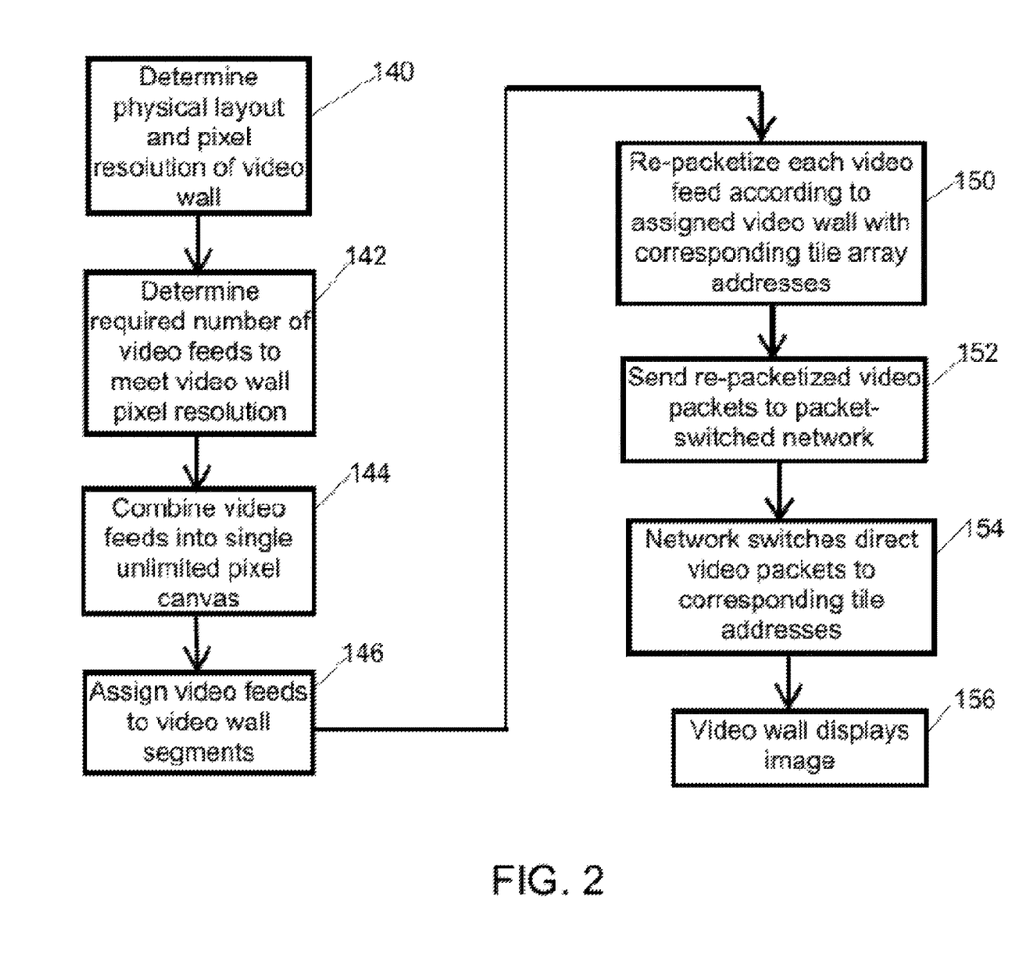
FIG. 2 is a flow diagram illustrating a method according to the present disclosure.

An embodiment of a method for delivering video content to a video wall according to the present disclosure is summarized in the flow diagram in FIG. 2. At step 140, the system determines the physical layout and pixel resolution of the video wall. In some system embodiments this may occur by direct communication between the video controller and the video wall. For example, each tile may be queried through the network for its unique ID, its size or resolution and position relative to neighboring tiles. Alternatively, a user may directly enter such information through the user interface or a file download. In one example, the video controller and video wall tile array are configured as a network with each tile in the array having a unique address, such as a MAC or IP address. Tiles automatically, or when prompted, announce themselves on the network and the video controller acknowledges the tile presence. Thereafter, the tiles and video controller communicate with each tile transmitting its display information, in particular displayable pixel width and height, to the video controller. With the display information on each tile in the video wall tile array, the video controller knows each tile location. and which and what amount of data to send to each tile. This tile display information may be saved as part of a video controller database, which the video controller may then use to display the tile in the video controller GUI, allowing the user to specifically place the tile at its location in the tile array in order to manually construct the tile array of the video wall in the video controller database. In some embodiments, video tiles may be provided with four communication links, one on each edge (up/down/left/right), that permit the tiles to communicate with adjacent tiles to receive the adjacent tile address information. Knowing the address and relative position of each adjacent tile allows the video controller to automatically construct the tile array configuration in memory by querying each tile as to the identity of its neighboring tiles. A person of ordinary skill may configure the tile addressing protocol based on the teachings of the present disclosure as best suited to a particular system.

At step 142, the required number of video feeds to meet the video wall pixel resolution is determined. In some cases, this step may be accomplished earlier as the video wall pixel resolution and required video feeds may be well-known to the user in advance. In other cases, the video controller may be configured to determine this information and direct the video source to deliver the required number of video feeds.

Once the video feeds are received in the video controller, at step 144, the controller combines the video feeds in controller memory to form the virtual, single unlimited pixel canvas. Using the single unlimited pixel canvas, at step 146 portions of the multiple video feeds are assigned to appropriate video wall segments where the portions will be displayed and combined to recreate the video image as a single continuous video across the video wall. In one embodiment, a depiction of the single unlimited pixel canvas is presented on a graphical user interface (GUI) driven by the video controller. Step 146 may be manually performed by user manipulation of graphical tools via the video controller GUI or the assignment may be automated to be performed by the video controller without user manipulation.

After each input raster (video feed) is assigned to an input segment of the video wall tile array, at step 150 the video controller re-packetizes each video feed according to assigned video wall segment based on tile array addresses as described above. In alternative embodiments, steps 146 and 150 may be combined. Then for the output stage 152, the smaller tile packets are transmitted destined for much smaller sized endpoints and thus are re-assembled into a picture on the tile array side. The "unlinked" nature of Ethernet being somewhat randomized in its payload pattern versus a conventional video raster coming in at a very known and established order distinguishes the disclosed embodiments from prior systems.

At step 152, the re-packetized streams are delivered to the network connecting the video display wall, and at step 154 the network switches direct the video packets to the corresponding tile addresses where they are presented on the video wall forming a seamless video image.

Figure 3:
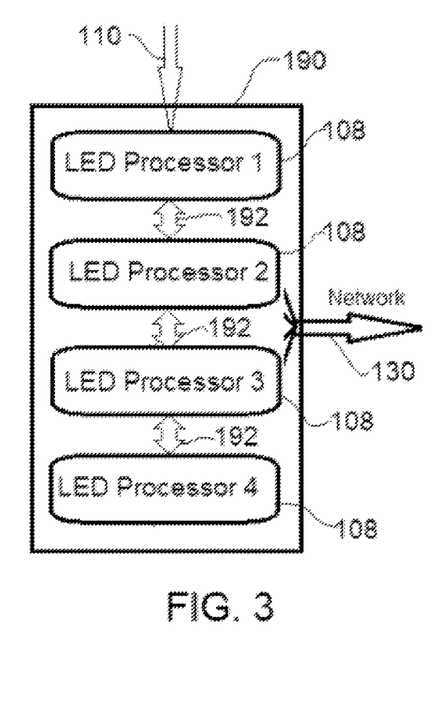
FIG. 3 is a block diagram of a multi-controller processing cluster according to the present disclosure.

Systems and methods disclosed herein provide increased flexibility in controlling extremely large video wall configurations using cluster computing techniques to form a distributed computing network linking plural video controllers 108. For example, where the pixel data requirements of a large video wall exceed the pixel capacity of a single video controller 108, plural video controllers 108 may be networked to form LED processing cluster 190 as shown in FIG. 3. In this example, four video controllers 108 are networked via network links 192, such as Ethernet connections. Any number of controllers may be networked to meet the pixel requirements of a specific video wall. Processing cluster 190 is configured such that all video controllers 108 combine their respective plurality of unlimited pixel canvases 122 into a single super-canvas, which is presented to the user on GUI 120 as described above. The plurality of networked video controllers 108 works as a cluster to send a unified pixel data protocol to the tile array, and display tiles can span across input video rasters while being controlled as a single array (rather than an array per video raster). The networked cluster may use a consensus based algorithm to automatically distribute a state machine across multiple processors, although many other clustering approaches are possible. Control of processing cluster 190 may be configured in a number of different ways by persons skilled in the art of network computing based on the teachings of the present disclosure. For example, processing cluster 190 may be configured to be end-user controllable by a GUI or API, and/or by any individual video controller that is part of the cluster. End-user control also may be provided via a GUI hosted on one of the video controllers that is part of the cluster. In another alternative, end-user control is a web-based GUI hosted on or served by one of the video controllers that is part of processing cluster 190.

Due to the relatively high bandwidth of Ethernet and comparatively low pixel count of even larger video walls, it can be advantageous to link tiles together with at least one upstream and one downstream port. For network redundancy, it is possible to send the packetized video to multiple links on a tile (feeding upstream and downstream ports) simultaneously. For cases when tiles have more than two ports, for example four ports, one on each side as in networked video wall system 160 in FIG. 4, Ethernet can be fed from all four sides of each tile. For further redundancy, it is possible for more than four streams to be sent to each tile because of the capabilities of the Ethernet switch. For example, the tile listens to N+1 packet streams, and a controller can tell the tile which stream is of higher priority. If a specific stream is not available, the tile can be programmed to display to the next highest priority stream and so on.

Figure 4A:
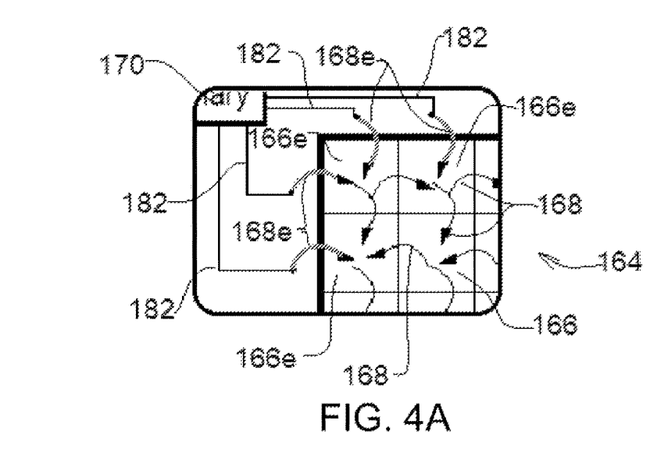
FIG. 4A is a detail view of the upper left corner of the video wall shown in FIG. 4.

An example of a networked video wall system 160 with robust tile redundancy taking advantage of the above features is shown in FIGS. 4 and 4A. Networked video wall system 160 is one example of an embodiment of network 130 shown in FIGS. 1, 1A and 3. In the FIG. 4 example, networked video wall system 160 is an LED video wall and thus includes LED controller 162, which may employ the unlimited pixel canvas methodology for delivering video content as described above with respect to video controller 108. Other processing methodologies also may be employed in LED controller 162. Video wall 164 includes an array of LED tiles 166, however other video display modes may be employed. This particular example shows a 10×5 tile array, however any number of tiles may be used. Each of tiles 166 is provided with four communications links 168, one on each side of the tile. (Curved arrows within video wall 164 in FIG. 4 represents a communication link. Only four representative links are labeled with reference numeral 168 to avoid congestion on FIG. 4; the detailed view in FIG. 4A includes more labels.) Communication links 168 may be comprised of Ethernet-based connections for transferring video data and tile communications at sufficient speed to avoid latency issues in the video feed. It is to be noted that in order to provide a fully redundant system, communication links 168 provide both the tile mesh network and data network with redundancy mechanisms.

In the FIG. 4 example, two network switches are shown: primary network switch 170 and backup network switch 172, communicating with LED controller 162 through primary and backup network connections 174 and 176, respectively. While two network switches are shown, another example would employ four network switches, one feeding primary or backup video from each corner of the LED tile array. Further, redundancy may be provided by connecting primary and backup switches via one or more network trunk lines 178. Primary and backup network connections 174, 176, as well as optional network trunk lines 178 (if provided) may comprise high-speed network connections such as Gigabit Ethernet or higher using one or more copper or fiber optic cables. Similarly, more than one LED controller 162 also may be employed, for example as a cluster as shown in FIG. 3. Network connections 182, which may be conventional Ethernet cables, provide video feed and data communications with tiles 166 via communication links 168e on the open edges of edge tiles 166e at the periphery of the video wall (see FIG. 4A). For tiles 166 with edges facing other tile edges, communication links 168 join the adjacent tiles. Communication links 168 also may be optionally configured to deliver power to the tiles.

With the mesh network topology created by plural inter-tile communication links as shown in FIG. 4, and including multi-point primary and backup data links (primary switch 170, and backup switch 172, each with independent network connections 182 to tiles 166), there are multiple data paths to each individual LED tile 166 such that failure of one or more communication links between tiles does not lead to dead tiles in the tile array as with conventional daisy chaining of the video links between tiles. This arrangement even protects against certain catastrophic failure modes, such as failure of an entire column of side-to-side links 168 between tiles 166, which may happen if a large object fell against the rear of the video wall and physically damaged an entire column of cabling (snagging cables as a large tool falls, for example). Without the backup data links provided via backup network switch 172 and its independent network connections 182, half of video wall 164 would not receive data and would not be able to display an image in such a catastrophic failure mode.

Figure 4B:
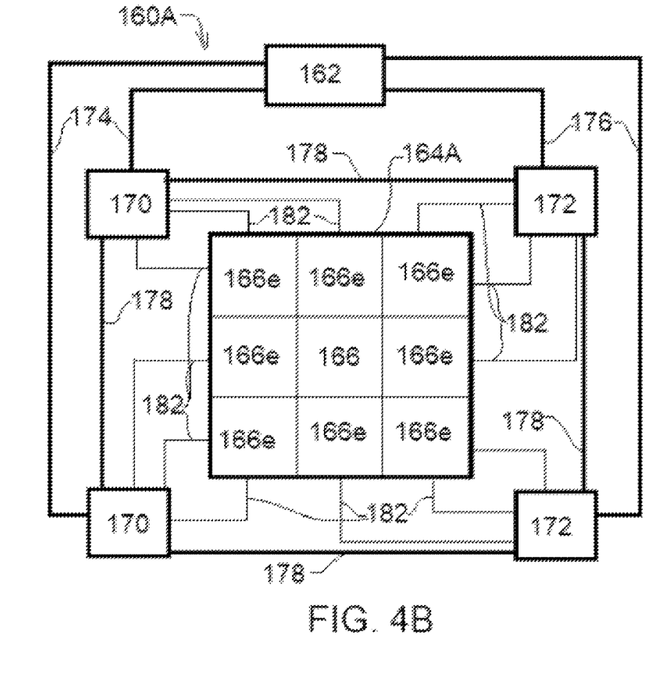
FIG. 4B is a schematic diagram of an alternative embodiment of a networked video wall system according to the present disclosure.

FIG. 4B illustrates another embodiment of networked video wall system 160A. System 160A may be constructed substantially the same as system 160, but in this case with two primary network switches 170 and two backup network switches 172. Primary network connections 174 and backup network connections 176 are thus duplicated, as are optional trunk lines 178 between network switches. In FIG. 4A, edge tiles around the periphery of video wall 164A are separately labelled as 166e for greater clarity. Network connections 182 are made to the communication links on the open, outer edges of each edge tile around the periphery of video wall 164A. Communication links 168 are not separately shown in FIG. 4B, but are provided in the same manner as shown in FIGS. 4 and 4A.

Embodiments disclosed herein thus provide, among other advantages, a network of LED controllers that seamlessly combine their input video rasters into a single super canvas of unlimited pixel resolution that can be easily configured to match any video wall. These techniques allow a light-emitting display device capable of spanning across two or more traditional video rasters.

Described embodiments also offer cabling restriction-free topology. Embodiments are provided in which all video controllers may feed into a super-fat network backbone (i.e. 100G) between all network switches. With this configuration, the system does not require a rigid cabling relationship between video controllers to tiles as in prior art systems.

Physical embodiments include an example video wall comprised of an array of tiles large enough that it must span multiple video controllers. The input to each video controller may be from a common TCP/IP-based video network such that any video controller has access to any portion of the screen raster. The video controllers communicate together as a computing network to determine how to divide the raster up in order to load balance it between themselves. Each video controller then communicates to the IP-based video network the coordinates and size of the sub-raster to request as input. Further, the output from each video controller feeding an array of tiles can be fed into one or more Ethernet networks shared between all video controllers of the system such that the network aggregate bandwidth is of adequate capacity to handle the communication of multiple video controllers feeding to many tiles. The video controllers thus work collectively to determine how to divide the tiles up to balance the processing between controllers. This balancing is also part of the calculation for the video controllers to then request the appropriate raster size and location to the TCP/IP-based video network to feed the input to the video controller.

Systems and methods as disclosed herein include LED tile networks utilizing VLANs to designate the routing of the data between LED controllers and tiles through the Ethernet switching network. Alternatively, embodiments may utilize a flat network without VLANs to discover all LED tiles and communicate and direct traffic to each tile based upon the MAC address of the tile. Further, disclosed systems and methods may comprise a network switch receiving data from LED controllers into a single network switch or group of network switches using fiber, copper, or DirectAttach network interfaces. The network may use one or more high bandwidth links utilizing copper or fiber to communicate to a plurality of network switches at the video display wall side. LED controllers in such systems and methods may take into account the bandwidth availability through different portions of the switching network as a component of determining how to divide the traffic between controllers.

In additional alternative embodiments, systems and methods are disclosed in which the LED tile array forming a video wall and interconnected mesh network as part of the load balancing between LED controllers and a switching network. Inputs to the controllers may be fed from multiple outputs of a media server or screen switching video controller using traditional video signals such as, but not limited to HDMI, DisplayPort, SDI, etc., where multiple LED controllers are required to handle the array of tiles in the video wall. The LED controllers divide the screen into multiple rasters and communicate to the media server the size and details of the raster using EDID, DisplayID, API, or other such that the media server can intelligently feed the array of controllers with the appropriately sized rasters.

Figure 5:
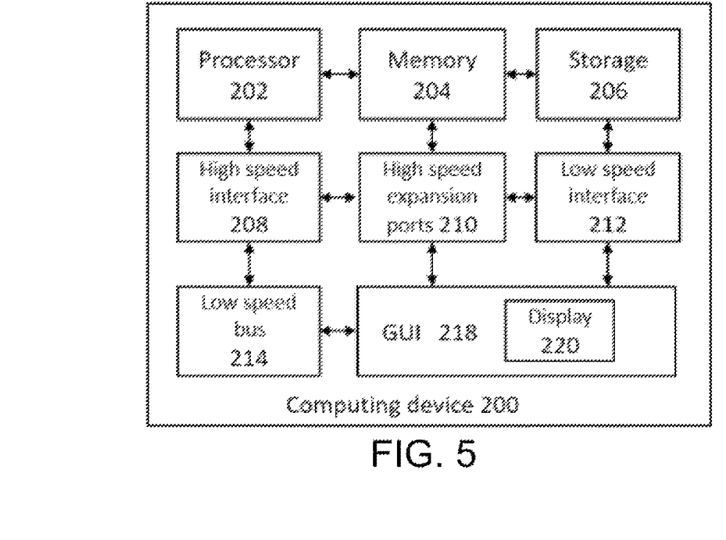
FIG. 5 is a block diagram illustrating an example of a computing device as may be used to execute systems and methods disclosed herein.

In some embodiments, video/LED controllers 108, 162, including GUI 120, may be executed as one or more computing devices 200 as illustrated in FIG. 5. In this example, computing device 200 includes one or more processors 202, memory 204, storage device 206, high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses or other suitable connections as indicated in FIG. 5 by arrows connecting components. Processor 202 can process instructions for execution within the computing device 200, including instructions stored in the memory 204 or on the storage device 206 to display graphical information via GUI 218 with display 220, or on an external user interface device, coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Memory 204 stores information within the computing device 200. In one implementation, the memory 204 is a computer-readable medium. In one implementation, the memory 204 is a volatile memory unit or units. In another implementation, the memory 204 is a non-volatile memory unit or units.

Storage device 206 is capable of providing mass storage for the computing device 200, and may contain information such as the database of tile display information described hereinabove. In one implementation, storage device 206 is a computer-readable medium. In various different implementations, storage device 206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 204, the storage device 206, or memory on processor 202.

High speed controller 208 manages bandwidth-intensive operations for the computing device 200, while low speed controller 212 manages lower bandwidth-intensive operations. Such allocation of duties is exemplary only. In one implementation, high-speed controller 208 is coupled to memory 204, display 220 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices as part of GUI 218 or as a further external user interface, such as a keyboard, a pointing device, a scanner, or a networking device such as a switch or router, e.g., through a network adapter.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LED, OLED or LCD display) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further alternative embodiments include methods for delivering video content comprising pixel data to a high resolution video wall comprised of an array of video display tiles wherein each video display tile has a unique address within the array. Method steps may include: receiving a plurality of video input streams, wherein the input streams each contain a portion of the pixel data needed to render the video content on the display wall and the plurality of input streams in aggregate comprise all of the needed pixel data; combining the video input streams to form a virtual representation of the video content in a memory at a resolution at least equal to the video wall resolution; partitioning pixel data from the virtual representation into packets with the unique tile address for a corresponding tile position in the video wall based on pixel data position in the virtual representation; and transmitting the pixel data packets to the video wall through a packet-switched network.

A further embodiment of the methods disclosed herein is a method for delivering video content comprising pixel data to a high resolution video wall comprised of an array of video display tiles, wherein each video display tile has a unique address within the array. In some embodiments, the array of video display tiles may be an array of LED tiles. Such a method may comprise receiving one or more video input streams containing less pixel data than needed for rendering the video content on the video wall at the video wall resolution; upscaling the one or more video input streams to generate at least one upscaled video input stream comprising pixel data necessary to render the video content at the video wall resolution; virtually rendering the video content from the at least one upscaled video input stream in a memory to form a virtual representation of the video content in the memory at a resolution at least equal to the video wall resolution; partitioning pixel data from the virtual representation into packets each with the unique tile address for tile positions in the video wall corresponding to the pixel data position in the virtual representation; and transmitting the pixel data packets to the video wall through a packet-switched network.

Yet another embodiment of the methods disclosed herein is a method for delivering video content comprising pixel data to a high resolution video wall comprised of an array of video display tiles, wherein each video display tile has a unique address within the array. In some embodiments, the array of video display tiles may be an array of LED tiles. Such a method may comprise receiving one or more video input streams containing more pixel data than needed for rendering the video content on the video wall at the video wall resolution; downscaling the one or more video input streams to generate at least one downscaled video input stream comprising pixel data necessary to render the video content at the video wall resolution; virtually rendering the video content from the at least one downscaled video input stream in a memory to form a virtual representation of the video content in the memory at a resolution at least equal to the video wall resolution; partitioning pixel data from the virtual representation into packets each with the unique tile address for tile positions in the video wall corresponding to the pixel data position in the virtual representation; and transmitting the pixel data packets to the video wall through a packet-switched network.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A method for delivering video content comprising pixel data to a high resolution video wall comprised of an array of video display tiles, each said video display tile having a unique tile address within the array, the method comprising:
receiving one or more video input streams containing pixel data for rendering the video content on the video wall;
virtually rendering the video content in a memory from the one or more video input streams to form a virtual representation of the video content in the memory at a resolution at least equal to the video wall resolution;
partitioning pixel data from said virtual representation into pixel data packets each with the unique tile address for tile positions in the video wall corresponding to the pixel data position in the virtual representation; and
transmitting the pixel data packets to the video wall through a packet-switched network;
wherein:
the one or more video input streams contain less pixel data than needed from rendering the video content on the video wall at the video wall resolution; and
said virtually rendering comprises—
upscaling the one or more video input streams to generate at least one upscaled video input stream comprising pixel data necessary to render the video content at the video wall resolution; and
rendering the video content in the memory to form said virtual representation of the video content from the at least one upscaled video input stream.

2. The method of claim 1, wherein:
said receiving comprises receiving a plurality of video input streams;
each said input stream of the plurality of video input streams contains a portion of the pixel data needed to render the video content on the video wall;
said plurality of video input streams in aggregate comprise all of said needed pixel data; and
said virtually rendering comprises combining the plurality of video input streams in the memory to form said virtual representation of the video content.

3. A method for delivering video content comprising pixel data to a high resolution video wall comprised of an array of video display tiles, each said video display tile having a unique tile address within the array, the method comprising,
receiving one or more video input streams containing pixel data for rendering the video content on the video wall;
virtually rendering the video content in a memory from the one or more video input streams to form a virtual representation of the video content in the memory at a resolution at least equal to the video wall resolution;
partitioning pixel data from said virtual representation into pixel data packets each with the unique tile address for tile positions in the video wall corresponding to the pixel data position in the virtual representation; and
wherein:
the one or more video input streams contain more pixel data than needed for rendering the video content on the video wall at the video wall resolution; and
said virtually rendering comprises—
downscaling the one or more video input streams to generate at least one downscaled video input stream comprising pixel data necessary to render the video content at the video wall resolution, and
rendering the video content in the memory to form said virtual representation of the video content from the at least one downscaled video input stream.

4. The method of claim 1, wherein said receiving comprises receiving the one or more video input streams in an video controller system.

5. The method of claim 4, wherein the video controller system comprises a single video controller.

6. A method for delivering video content comprising pixel data to a high resolution video wall comprised of an array of video display tiles, each said video display tile having a unique tile address within array, the method comprising:
receiving one or more video input streams containing pixel data for rendering the video content on the video wall;
virtually rendering the video content in a memory from the one or more video input streams to form a virtual representation of the video content in the memory at a resolution at least equal to the video wall resolution;
partitioning pixel data from said virtual representation into pixel data packets each with the unique tile address for tile positions in the video wall corresponding to the pixel data position in the virtual representation; and
transmitting the pixel data packets to the video wall through a packet-switched network;
wherein said receiving comprises receiving the one or more video input streams in an video controller system;
wherein the video controller system comprises a single video controller, and
wherein pixel data needed for rendering the video content exceeds a capacity of a single video controller and the video controller system comprises plural networked video controllers functioning as a computing cluster to render the virtual representation of the video content across at least one memory.

7. The method of claim 6, wherein the computing cluster is end-user controllable by any individual video controller that is part of the computing cluster.

8. The method of claim 6, wherein end-user control comprises a GUI hosted on one of the video controllers that is part of the computing cluster.

9. The method of claim 6, wherein end-user control is a web-based GUI hosted on or served by one of the video controllers that is part of the computing cluster.

10. The method of claim 1, wherein:
the array of video display tiles comprises tiles each having two or more network interfaces; and
said transmitting comprises transmitting pixel data packets to more than one network interface on each video display tile.

11. A method for delivering video content comprising pixel data to a high resolution video wall comprised of an array of video display tiles, each said video display tile having a unique tile address with the array, the method comprising:
receiving one or more video input streams containing pixel data for rendering the video content on the video wall;
virtually rendering the video content in a memory from the one or more video input streams to form a virtual representation of the video content in the memory at a resolution at least equal to the video wall resolution,
partitioning pixel data from said virtual representation into pixel data packets each with the unique tile address for tile positions in the video wall corresponding to the pixel data position in the virtual representation; and
transmitting the pixel data packets to the video wall through a packet-switched network;
wherein:

the array of video display tiles comprises tiles each having two or more network interfaces;
    said transmitting comprises transmitting pixel data packets to more than one network interface on each video display tile:
each said video display tile comprises a pixel array surrounded by plural tile edges with each said tile edge having a network interface; and
said transmitting comprises transmitting pixel data packets to each said network interface on each video display tile through a redundantly switched mesh network formed by the video wall tile array.

12. The method of claim 1, further comprising determining a physical layout and pixel resolution of the video wall, and wherein said virtually rendering is based at least in part on determining of the physical layout and pixel resolution of the video wall.

13. A method for delivering video content comprising pixel data to a high resolution video wall comprised of an array of video display tiles, each said video display tile having a unique tile address within the array, the method comprising:
    receiving one or more video input streams containing pixel data fro rendering the video content on the video wall;
    virtually rendering the video content in a memory from the one or more video input streams to form a virtual representation of the video content in the memory at a resolution at least equal to the video wall resolution;
    partitioning pixel data from said virtual representation into pixel data packets each with the unique tile address for tile positions in the video wall corresponding to the pixel data position in the virtual representation;
    transmitting the pixel data packets to the video wall through a packet-switched network; and
    determining a physical layout and pixel resolution of the video wall, and wherein said virtually rendering is based at least in part on determining of the physical layout and pixel resolution of the video wall;
        wherein the video display tile array is configured as a network and said determining comprises:
    each tile transmitting its tile display information to a video controller, said tile display information comprising tile location for each tile and an amount of data to send to each tile;
    saving the tile display information in a database accessible by the video controller; and
    automatically constructing the tile array configuration in a video controller memory based on the tile display information saved in the database.

14. The method of claim 13, wherein the tile display information includes the unique address for each tile and relative position of each with respect to adjacent tiles in the tile array.

15. The method of claim 12, further comprising:
    displaying tiles in a GUI; and
    allowing a user to construct the tile array in the database by placing the tiles at their respective locations in the tile array through interaction with the GUI.

16. The method of claim 12, wherein said determining comprises a user directly entering the physical layout and pixel resolution into a video controller through a user interface or a file download.

17. A video controller for rendering video content on a high resolution video wall, the video wall comprised of an array of display tiles with each said tile having a unique tile address within the array, the video controller comprising a processor and memory configured to receive one or more video input streams containing pixel data for rendering the video content across the display tile array, wherein the memory contains instructions configured to be executed by the processor to cause the video controller to:
    virtually render the video content from the one or more video input streams in memory to form a virtual representation of the video content in the memory at a resolution at least equal to the video wall resolution;
    partition pixel data from said virtual representation into pixel data packets each with the unique tile address for tile positions in the video wall tile array corresponding to the pixel data position in the virtual representation in the memory; and
    transmit the pixel data packets to the video wall through a packet-switched network;
    wherein said video controller is configured to render video content based on at least two different video stream input conditions comprising:
    (1) a plurality of video input streams wherein each of the plurality of input streams contains a portion of the pixel data needed to render the video content on the video wall, the plurality of input streams in aggregate comprise all of said needed pixel data;
    (2) one or more video input streams containing less pixel data than needed for rendering the video content on the video wall at the video wall resolution; and
    (3) the one or more video input streams contain more pixel data than needed for rendering the video content on the video wall at the video wall resolution.

18. The video controller of claim 17, wherein the memory contains further instructions configured to be executed by the processor to cause the video controller to virtually render the video received in input condition (1) by combining the plurality of video input streams in the memory to form said virtual representation of the video content.

19. The video controller of claim 17, wherein the memory contains further instructions configured to be executed by the processor to cause the video controller to virtually render the video received in input condition (2) by—upscaling the one or more video input streams to generate at least one upscaled video input stream comprising additional pixel data as needed to render the video content at the video wall resolution; and
    rendering the video content in the memory to form said virtual representation of the video content from the one or more upscaled video input streams.

20. The video controller of claim 17, wherein the memory contains further instructions configured to be executed by the processor to cause the video controller to virtually render the video received in input condition (3) by—downscaling the one or more video input streams to generate at least one downscaled video input stream comprising additional pixel data as needed to render the video content at the video wall resolution, and rendering the video content in the memory to form said virtual representation of the video content from the one or more downscaled video input streams.

21. A video wall system, comprising:
    an array of adjacent display tiles forming a video wall having a video wall resolution, each said display tile having a unique tile address and a display surface comprised of a pixel array surrounded by plural tile edges, the display wall having a periphery defined by open tile edges not adjacent another tile edge;

data connections at each tile edge forming a data link with each adjacent tile in said array of display tiles, said data links configured to transfer at least video signal data and control data;

a video controller configured to receive one or more video input streams and output packetized video content for display on the video wall;

at least one primary network switch communicating with the video controller through at least one primary network connection;

at least one backup network switch communicating with the video controller through at least one backup network connection;

primary tile connections comprising independent network connections between the at least one primary network switch and each of at least a first plurality of tile edge data connections on open tile edges; and backup tile connections comprising independent network connections between the at least one backup network switch and each of at least a second plurality of tile edge data connections on open tile edges;

whereby the at least one primary network switch directs packetized video content to the tile array for display according to tile addresses assigned to the video content packets and said at least one backup network switch provides plural redundant pathways for video content packets in the event of failure of one or more tile data connections so as to eliminate or reduce display errors resulting from failed tile data connections.

22. The video wall system of claim 21, wherein the independent network connections to said pluralities of tile edge data connections on open tile edges collectively comprise data connections to all open tile edges.

23. The video wall system of claim 21, wherein at least one trunk line connects the at least one primary network switch and the at least one backup network switch.

24. The video wall system of claim 21, wherein the video controller comprises a processor and memory containing instructions configured to be executed by the processor to cause the video controller to:

virtually render the video content from the one or more video input streams in memory to form a virtual representation of the video content in the memory at a resolution at least equal to the video wall resolution;

partition pixel data from said virtual representation into packets each with the unique tile address for tile positions in the video wall tile array corresponding to the pixel data position in the virtual representation in the memory; and transmit the pixel data packets to the video wall through a packet-switched network.

25. The video wall system of claim 24, wherein said video controller is configured to render video content based on at least three different video stream input conditions comprising:

(1) a plurality of video input streams wherein each of the plurality of input streams contains a portion of the pixel data needed to render the video content on the video wall, the plurality of input streams in aggregate comprise all of said needed pixel data;

(2) one or more video input streams containing less pixel data than needed for rendering the video content on the video wall at the video wall resolution; and (3) the one or more video input streams contain more pixel data than needed for rendering the video content on the video wall at the video wall resolution.

26. The video wall system of claim 24, wherein the memory contains further instructions configured to be executed by the processor to cause the video controller to virtually render the video received in input condition (1) by combining the plurality of video input streams in the memory to form said virtual representation of the video content.

27. The video wall system of claim 24, wherein the memory contains further instructions configured to be executed by the processor to cause the video controller to virtually render the video received in input condition (2) by— upscaling the one or more video input streams to generate at least one upscaled video input stream comprising additional pixel data as needed to render the video content at the video wall resolution; and rendering the video content in the memory to form said virtual representation of the video content from the one or more upscaled video input streams.

28. The video wall system of claim 24, wherein the memory contains further instructions configured to be executed by the processor to cause the video controller to virtually render the video received in input condition (3) by— downscaling the one or more video input streams to generate at least one downscaled video input stream comprising additional pixel data as needed to render the video content at the video wall resolution, and rendering the video content in the memory to form said virtual representation of the video content from the one or more downscaled video input streams.

* * * * *

UNITED STATES PATENT AND TRADEMARK OFFICE
CERTIFICATE OF CORRECTION

PATENT NO. : 11,594,195 B2
APPLICATION NO. : 17/727980
DATED : February 28, 2023
INVENTOR(S) : Jeremy Hochman et al.

It is certified that error appears in the above-identified patent and that said Letters Patent is hereby corrected as shown below:

In the Claims

In Column 15, Line 18, Claim 1, the word "from" should be replaced with word "for".

In Column 15, Line 42, Claim 3, the (",") should be replaced with a (":").

In Column 16, Line 9, Claim 6, the word "the" should be added between the words "within" and "array".

In Column 16, Line 26, Claim 6, the (",") should be replaced with a (";").

In Column 16, Line 51, Claim 11, the word "with" should be replaced with the word "within".

In Column 16, Line 59, Claim 11, the (",") should be replaced with a (";").

In Column 17, Line 5, Claim 11, the (":") should be replaced with a (";").

In Column 17, Line 24, Claim 13, the word "fro" should be replaced with the word "for".

Signed and Sealed this
Second Day of May, 2023

Katherine Kelly Vidal
*Director of the United States Patent and Trademark Office*